April 5, 1938.　　　　F. KESSEN　　　　2,113,350
BRAKE EQUALIZER
Filed June 23, 1934　　　3 Sheets-Sheet 3
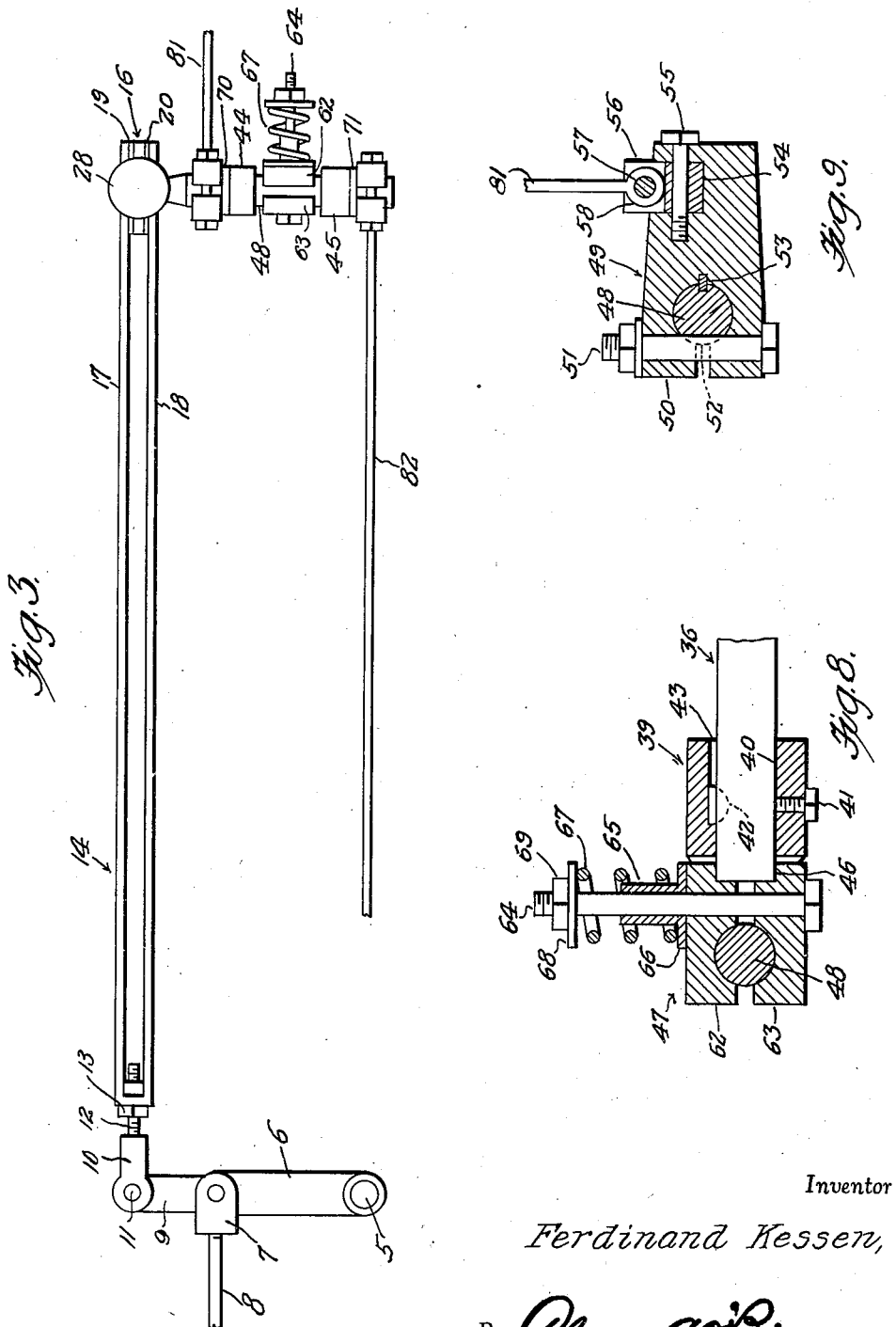
Inventor
*Ferdinand Kessen,*
By *Clarence A. O'Brien*
Attorney Patented Apr. 5, 1938

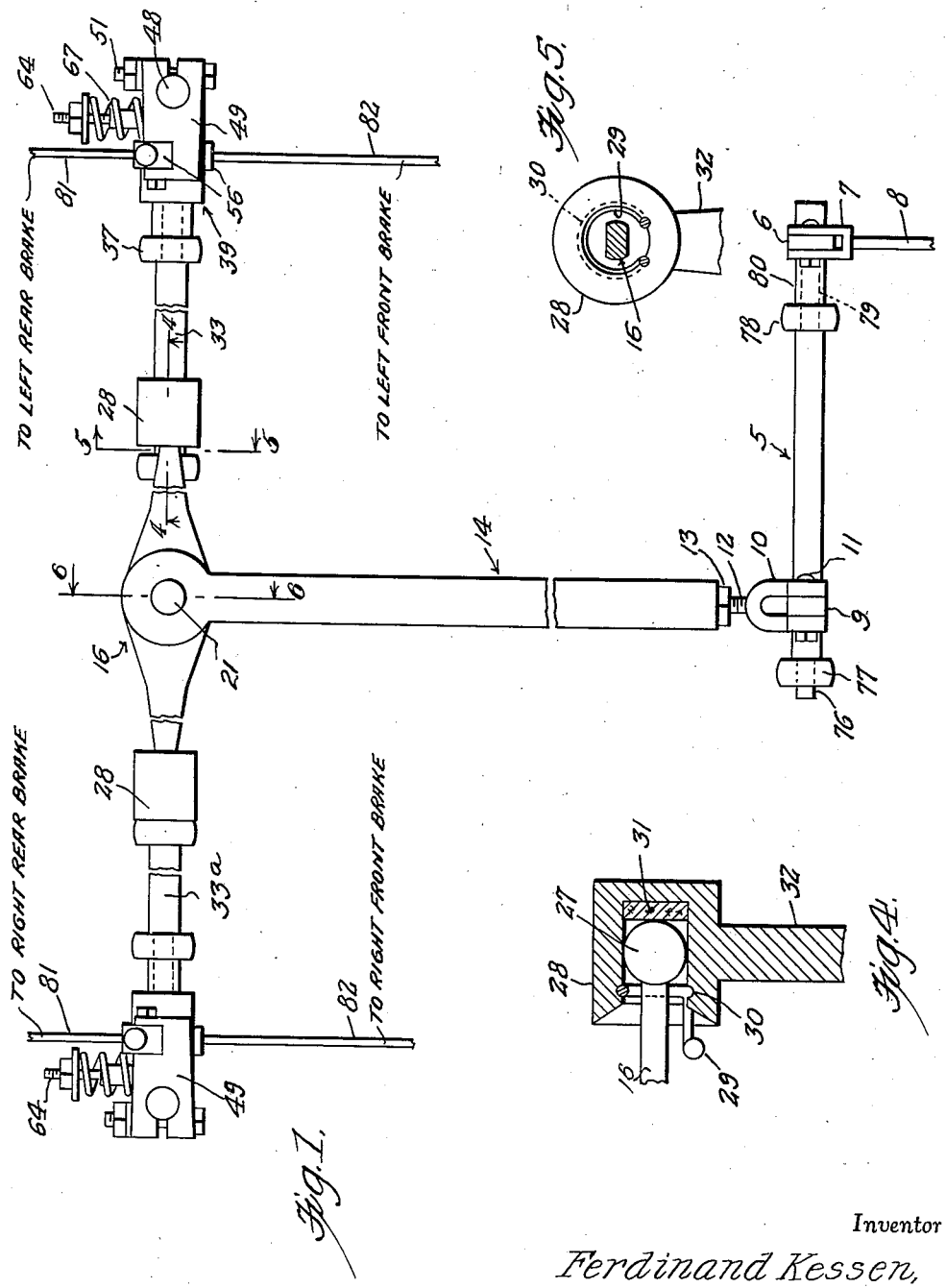

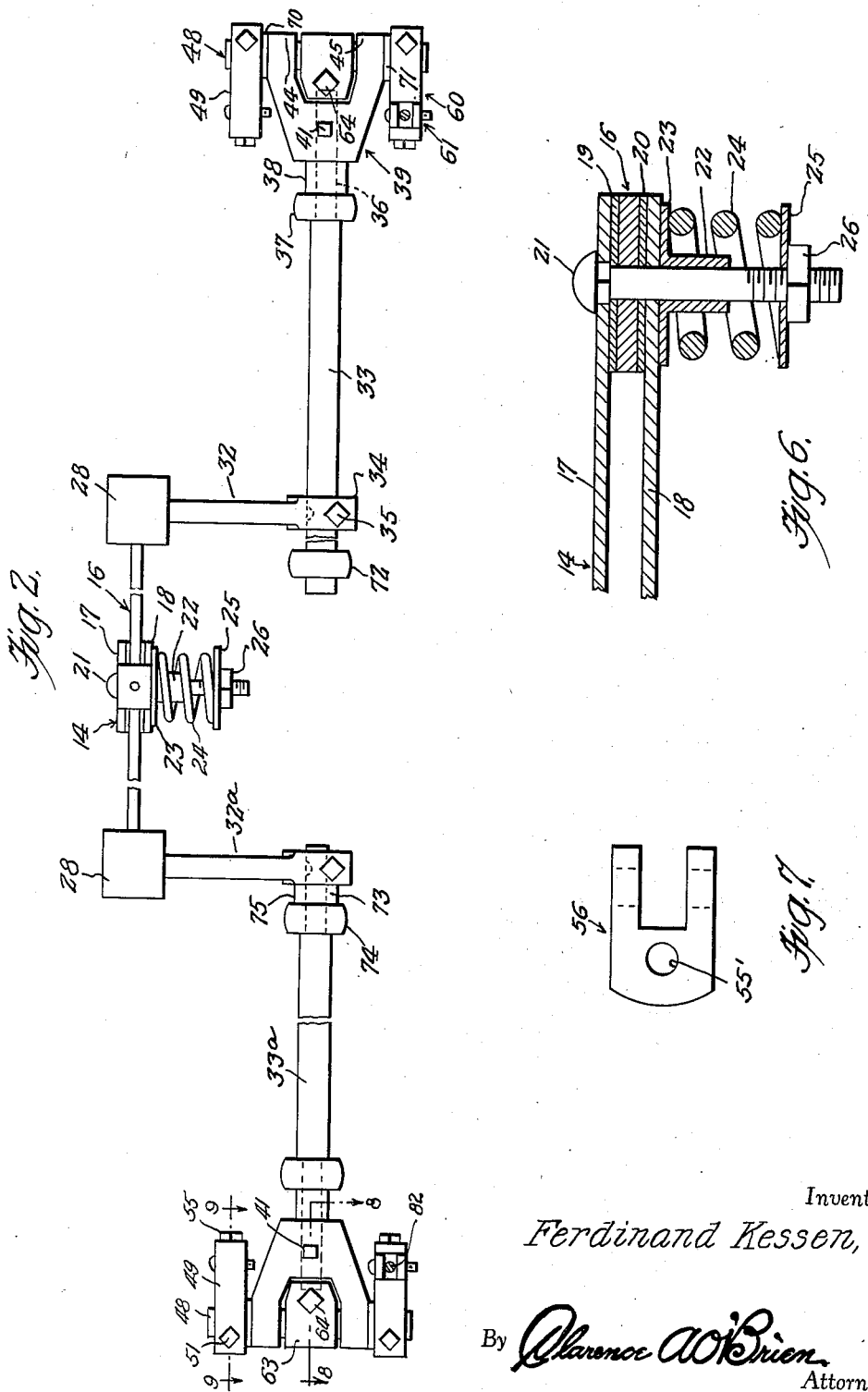

2,113,350

UNITED STATES PATENT OFFICE 2,113,350

BRAKE EQUALIZER

Ferdinand Kessen, Detroit, Mich.

Application June 23, 1934, Serial No. 732,154

1 Claim. (Cl. 188—204)

My invention relates generally to brake equalizers for vehicles having four wheel brakes, whether of the hydraulic or full-mechanical type, and an important object of my invention is to provide an equalizer which is simple and effective and may be readily installed on an automobile and connected to the existing brake system.

It is also an important object of my invention to provide an equalizer of the character indicated above wherein means is provided for automatically compensating for the differences in gripping action between the brakes on opposite sides of the vehicle, and between the front and rear brakes, the compensatory action being initiated by a difference in the force with which one or more of the related brakes engages its or their brake drums, so that a compensating pressure is caused to appear in the less operative brake or brakes, while the operative pressure indicated is proportionately reduced in the more strongly active brake or brakes.

Other objects and advantages of my invention will be apparent from a reading of the following description in connection with the drawings, wherein for purposes of illustration I have shown a preferred embodiment of my invention.

In the drawings:—

Figure 1 is a top plan view of the embodiment.

Figure 2 is a rear elevational view of the embodiment.

Figure 3 is an elevational view of the left hand side of the embodiment.

Figure 4 is a longitudinal sectional view taken through Figure 1 approximately on the line 4—4 and looking upwardly in the direction of the arrow.

Figure 5 is a transverse vertical sectional view taken through Figure 1 at a point slightly to the left of the left hand member 26 on the line 5—5 and looking toward the right in the direction of the arrow.

Figure 6 is an enlarged longitudinal sectional view taken through the rear end of the main bar along the line 6—6 of Figure 1 and looking toward the left in the direction of the arrow.

Figure 7 is a side elevational view of one of the brake rod attaching clevises.

Figure 8 is a transverse vertical sectional view through Figure 2 approximately on the line 8—8 and looking downwardly in the direction of the arrow.

Figure 9 is another transverse sectional view taken through Figure 2 approximately on the line 9—9 and looking downwardly in the direction of the arrow.

Referring in detail to the drawings, the numeral 5 refers generally to the brake pedal actuated shaft which is suitably rotatably mounted adjacent the brake pedal and the shaft 5 has the fixed lever 6 which has its upper or lower end of which connected by means of the clevis 7 to the rear end of the rod 8 leading to the brake pedal (not shown). If desired, the brake pedal may be mounted directly on the rod 5 in the stead of the lever 6, and the brake pedal or lever may be mounted at any longitudinal point on the rod 5. At another place on the rod 5 is another arm or lever 9 whose upper end is pivoted to and received between the arms of a clevis 10, the connection being made by a bolt or pin 11. The clevis 10 has a screw-threaded shank 12 which is engaged with a nut portion 13 on the front end of the main rod or bar 14 which extends rearwardly and is pivoted as indicated at 21 at its rearward extremity at the center of the double ended main equalizer lever 16.

As shown in Figure 3 the main bar 14 is U-shaped, and the shank 12 of the clevis 10 is threaded through the bight portion thereof. The rearward extremities of the arms 17, 18 are disposed above and below, respectively, the double ended lever 16 and washers 19, 20 constitute bearings between the upper and lower sides of the lever 16 and the respective sides of the bar 14, as shown in Figure 6.

A headed pivot bolt 21 passes downwardly through registering openings in the rear end of the side members of the arm 14, through the washers 19, 20, and through the lever 16, and through the sleeve 22 which has the flange 23 bearing against the bottom of the main bar side member 18 to confine and be engaged by the upper end of the helical spring 24 which is circumposed on the pivot 21 and on the sleeve 22 and whose lower end is engaged by and confined by a washer 25, the washer 25 being held in adjustable position by the nut 26 threaded on the lower end of the pivot bolt 21. As indicated the head of the pivot bolt 21 is squared to engage a conforming hole in the main bar upper side member 17 so that the pivot is prevented from turning. It is obvious that by threading the nut 26 along the pivot bolt 21 the compression of the spring 24 may be adjusted to increase or decrease the frictional engagement between the main bar 14 and the double ended lever 16, so that when the double ended lever 16 has been swung toward the right or toward the left in accordance with the resistance offered by the left and right hand brakes, the frictional engagement acts to hold the positon of the lever 16 assumed by it as a result of an operative engagement of the brakes with their brake bands or drums, through the co-operation of right and left equalizer assemblies. When the brakes are released the lever 16 remains in the position thus assumed. Since the construction of the left and right equalizing assemblies is approximately the same, the description of one will suffice for describing the other.

Either end of the double ended lever 16 has thereon a ball 27 which is confined in a socket 28 by a spring ring lock 29 seated in a groove 30 in the mouth of the socket, and a cork or other yielding insert 31 of a cushion type is provided in the bottom of the socket to prevent excessive clamping of the ball 27. The socket 28 is on the radially outward end of a lever 32 which is rigidly clamped on the transverse equalizer shaft 33 by a split clamp 34 contracted by a bolt 35, which bolt also acts as a key for engaging a recess in the side of the rod in a manner similar to the bolt 51 as shown in Figure 9. The laterally outward end of the equalizer shaft 33 is reduced as indicated at 36 and has a bearing 37 riding against the shoulder defined and also a short sleeve or spacer 38 whose axially outward end bears against the axially inward end of the main clevis 39. The reduced portion 36 passes axially outwardly through the bore 40 of the main clevis 39 and a set screw 41 locks the shaft portion 36 in engagement with the key 42 which is located in the keyway 43 in the bore of the main clevis, and the end of the shaft portion 36 extends axially outwardly and between the arms 44, 45 of the main clevis and engages in a fitting recess 46 in the spring pressed compensating clamp 47, which is located between the arms 44 and 45 of the main clevis 39.

Journaled in the arms of the main clevis and arranged therebetween and extending forwardly and rearwardly, respectively, at the opposite sides of these arms is the brake operating shaft 48. On the upper end of the shaft 48 is the brake operating arm 49 shown in detail in Figure 9 and which includes the bifurcated portion 50 receiving the shaft 48, a clamping bolt 51 passing through the furcations and engaging a recess 52 in the side of the shaft 48 so as to act as a key. A second key 53 is arranged in keyways in the arm 49 and in the side of the shaft 48 respectively. At the opposite or radially outward end of the brake operating arm 49 and on the side facing the brake to be controlled is a notch 54 which is traversed by the retaining bolt 55 which passes through and acts as a pivot for the brake rod clevis 56 shown in Figures 7 and 9. This clevis 56 has traversing the furcations thereof the connecting pivot 57 which passes through the eye 58 of the brake rod 81 which may lead directly to the mechanism which immediately operates the corresponding brake. The remaining brake operating arm 60 on the lower end of the shaft 48 is identical in structure but oppositely arranged so that its brake rod clevis 61 faces in a direction opposite to that in which the clevis 56 faces.

The compensating spring-pressed clamp 47 already referred to is located between the legs of the main clevis 39 and is composed of rear and front sections 62, 63, respectively, which have substantially semi-circular recesses therein to closely receive the shaft 48 as shown in Figure 8, and the rear and front sections are connected and positioned relative to each other by means of the bolt 64 which traverses them and traverses also the sleeve 65, which has the flange 66 resting against the rear section, and forms the guide for the compression helical spring 67 which is circumposed on the sleeve 65 and also on the rear part of the bolt 64 and has its rear end confined by a washer 68 held in place by the nut 69. It is obvious that by turning the nut 69 on or off the bolt 64 the spring 67 may be adjusted to cause the sections 62, 63 to have differently forceful frictional engagement or clamping engagement with the shaft 48, so that greater or less rotative force relative to the axis of the shaft 48 will be required to rotate the shaft 48 for swinging the brake arms 49 and 60. Washers 70, 71 on the shaft 48 space and take the wear between the respective brake operating arms 49 and 60 and the corresponding arms 44, 45 of the main clevis 39.

The axially inward end of the equalizer shaft 33 is mounted in a bearing 72 located axially inwardly of the lever 32, while the left hand shaft 33a has at its axially inward end a reduced portion 73 which turns in a bearing 74 and has thereon a spacer 75 located between the bearing 74 and the lever 32a.

It will be understood that the spring 67 might be mounted on the front side of the assembly shown in Figure 8 instead of on the rear side as shown, and the same arrangement can be made with respect to the spring 24 on the main bar 14, and also with respect to the arrangement of the various levers and brake arms, such changes of position being matters of convenience or of design, capable of being made by persons skilled in the pertinent art. The shaft 5 has a reduced end 76 supported in a bearing 77 and at its opposite end a bearing 78 supporting a reduced portion 79 on which is a sleeve 80 spacing the bearing 78 from the portion of the shaft on which the lever 6 is fixed.

When the brake pedal operated shaft 5 is rotated by application of the brake pedal in the brake applying direction the main bar 14 is pulled forwardly so that the equalizer assemblies will be rotated forwardly on their various bearings. As the bar 14 moves forwardly the lever 16 also moves forwardly which causes the members 32 and 32a to swing forwardly and thus the shafts 33 and 33a are partly rotated in their bearings. This movement of the shafts partly turns the clevises 39 so that the upper end of each shaft 48 swings forwardly while the lower end of each shaft swings rearwardly thereby causing the arms 49 connected with the upper ends of the shafts 48 to exert a pull upon the rear brake rods 81 and the lower arms 60 to exert a pull upon the front brake rods 82 and thus the brakes will be applied.

If the brakes at the right side of the vehicle should grip before those at the left side do, then the right arm 32 ceases to move while the left arm 32a continues its movement until the brakes at the left hand side of the vehicle are applied, as the lever 16 rocks or pivots on the bolt 21 and said lever 16 remains in this tilted position, after the brakes are released, due to the friction exerted on the same by the pressure of the spring 24 and the friction members 19 and 20. Thus if the left and right brakes are not equalized, upon the first application of the brakes they will be equalized and the means shown in detail in Figure 6 will thereafter hold the parts with the left and right brakes equalized.

Of course, if the left brakes grip before the right brakes, the equalization is reversed from that just described.

If the left rear brake is gripping and the left front brake is not, for instance, the rod 81 leading to the left rear brake will pull on arm or lever 49 to which it is attached, as pressure is being applied to the brake pedal, and this will cause the shaft 48 to which the arm or lever 49 is attached to rotate in the clevis 39, against the resistance of the clamps 62 and 63, as shown in Figure 8, and this causes a swinging movement of the lower arm 60 attached to the lower end of the shaft 48 so that a pull is exerted upon the front rod 82 leading to the left front brake and thus the front left brake is applied and the parts hereafter remain in this equalized position, due to the frictional engagement of the shaft 48 by the clamping means shown in Figure 8. Thus the front and rear left brakes will be equalized and the parts will remain in this equalized position. The same action will take place if the rear and front right brakes are not equalized.

Thus the center equalizer shown in detail in Figure 6 and the left and right equalizers shown in detail in Figure 8, will compensate for any unequal application of the right and left brakes as well as between the rear and front brakes. The equalizers will only come into action when the brake shoes contact the drums and only when a certain amount of pressure is applied to the brake pedal. Adjustment of the various springs described and shown must be made to provide the desired coaction of the parts described, as will be evident. It is also evident that the manner of connection of the main bar 14 with the clevis 10 provides longitudinal adjustment of the length of the main bar 14, and that other adjustments may be provided by lengthening or shortening or changing the position of the various levers and brake arms to predetermine the manner and the force of engagement of the brake shoes with their brake arms for exerting different braking effects.

If desired, the arrangement shown in Figure 1, wherein the main bar 14 is connected to a lever on the shaft 5 and the brake pedal (not shown) is connected to the shaft 5 by means of a link 8 and the lever 6, may be changed so that the main bar 14 will be hooked directly to the brake pedal. In the latter arrangement the shaft 5 is eliminated together with its fittings. If the brake pedal is located at one side of the longitudinal center of the vehicle (as it usually is) one of the shafts 33 and 33a will be provided shorter and the other longer so as to position the member 16 in longitudinal alignment with the location of the brake pedal or with the location of the lever 9 on the shaft 5, so that the main bar 14 will have normally a straight back and forward position, instead of being angulated toward one side and out of said longitudinal alignment.

Although I have shown and described herein a preferred embodiment of my invention, it is to be definitely understood that I do not desire to limit the application of the invention thereto, and any change or changes may be made in materials, and in the structure and arrangement of parts, within the spirit of the invention and the scope of the subjoined claim.

What is claimed is:—

An automatic equalizer for the brakes of the front and rear wheels of a vehicle, comprising a pair of transversely spaced transverse shafts rockably supported on the vehicle between the front wheel brakes and the rear wheel brakes, a laterally projecting lever fixed on each shaft, a main equalizer lever pivoted at its opposite ends to the radially outward ends of said levers, a main operating bar, pivot means pivoting the rear end of said main bar to an intermediate point of said main equalizer lever, and brake operating means on the said transverse shafts extending to the corresponding front and rear wheel brakes, said brake operating means including a fixed member on the laterally outward end of the corresponding transverse shaft, a vertical shaft rotatably mounted in said member and including brake operating arms on its opposite ends connectible respectively to the front wheel and rear wheel brakes, said member further including a split element fixed with respect to said member and clamping said vertical shaft, and spring means yieldably urging said split element to frictionally resist rotation of said vertical shaft.

FERDINAND KESSEN.